(12) United States Patent
Mueller et al.

(10) Patent No.: US 7,780,579 B2
(45) Date of Patent: Aug. 24, 2010

(54) WEIGHING SYSTEM USING ELECTROMAGNETIC FORCE COMPENSATION

(75) Inventors: Michael Mueller, Goettingen (DE); Ulrich Bajohr, Goettingen (DE); Michael Domhardt, Schmiedefeld (DE)

(73) Assignee: Sartorius AG, Goettingen (DE)

( * ) Notice: Subject to any disclaimer, the term of this patent is extended or adjusted under 35 U.S.C. 154(b) by 1017 days.

(21) Appl. No.: 11/373,122

(22) Filed: Mar. 13, 2006

(65) Prior Publication Data

US 2006/0161386 A1    Jul. 20, 2006

Related U.S. Application Data

(63) Continuation of application No. PCT/EP2004/009137, filed on Aug. 14, 2004.

(30) Foreign Application Priority Data

Sep. 12, 2003   (DE) ................ 103 42 272

(51) Int. Cl.
*A63B 22/12*   (2006.01)
(52) U.S. Cl. .............. 482/62; 482/903; 482/57

(58) Field of Classification Search ............ 482/5, 482/6, 7

See application file for complete search history.

(56) References Cited

FOREIGN PATENT DOCUMENTS

| DE | 31 09 880 A1 | 1/1982 |
|---|---|---|
| DE | 37 43 073 A1 | 7/1988 |
| DE | 195 40 782 C1 | 12/1996 |
| DE | 198 04 439 C1 | 6/1999 |
| DE | 199 23 208 C1 | 10/2000 |

*Primary Examiner*—Jerome Donnelly
(74) *Attorney, Agent, or Firm*—Sughrue Mion, PLLC

(57) ABSTRACT

A weighing system, using the principle of electromagnetic force compensation, which includes a permanent magnet system (14) having an air gap, a shielding cover (12), a coil (13) located inside the air gap, a transmission lever (7) to whose longer lever arm the coil is attached, and upon whose shorter lever arm the weight transferred by the load receiver acts, a position sensor (20, 21, 22) which detects the position of the transmission lever and which is situated in the vicinity of the coil, and a control amplifier (16) for controlling the current passing through the coil. Further, at least one vertical support (25) is connected to the transmission lever in the vicinity of the coil and the position sensor and projects through an opening (27) in the shielding cover. A counterweight (26) is placed on this/these support(s) closely above the shielding cover.

16 Claims, 2 Drawing Sheets

WEIGHING SYSTEM USING ELECTROMAGNETIC FORCE COMPENSATION

This is a Continuation of International Application PCT/EP2004/009137, with an international filing date of Aug. 14, 2004, which was published under PCT Article 21(2) in German, and the disclosure of which is incorporated by reference into this application in its entirety.

BACKGROUND OF THE INVENTION

1. Field of the Invention

Apparatuses consistent with the present invention relate to a weighing system using the principle of electromagnetic force compensation.

An exemplary weighing system compatible with the invention includes a permanent magnet system with an air gap and a shielding cover. A coil disposed in the air gap of the permanent magnet system produces the load-dependent counterforce. A transmission lever has a longer lever arm to which the coil is attached and a shorter lever arm on which the weight transferred by a load receiver acts either directly or is reduced through additional levers. A position sensor which detects the position of the transmission lever is arranged near the coil. A control amplifier is used to control the current flowing through the coil.

2. Description of the Related Art

Related art weighing systems are disclosed, for example, in German Publication DE 37 43 073 A1.

When these weighing systems have high dead loads on the load receiver, e.g., heavy weighing pans or roller conveyors, which may also be equipped with motors to drive the rollers, these dead loads must either be compensated by additional current in the coil, which generates additional heat, or counterweights are attached to the transmission lever. A weighing system with a counterweight is disclosed, for example, in the German Publication DE 198 04 439 C1. Here, the transmission lever is extended beyond the fixation point of the coil and carries the counterweight at the end of the lever. This solution is suitable only for slow weighings, however. Natural oscillations of the transmission lever, which have nodal points on the lever bearing and on the counterweight, interfere with rapid weighings. These oscillations are excited by the forces of the coil, which change rapidly in rapid weighings and subside only slowly, such that the time to reach a stable weighing result is relatively long.

OBJECTS OF THE INVENTION

Thus, it is an object of the invention to provide a weighing system using the principle of electromagnetic force compensation, which enables rapid determination of the weighing result even in the presence of dead loads.

SUMMARY OF THE INVENTION

According to an aspect of the invention, this is achieved by connecting at least one vertical support to the transmission lever in the vicinity of the coil and the position sensor so that it extends through at least one opening in the shielding cover and by arranging a counterweight on this or these support(s) closely above the shielding cover.

With this arrangement of the counterweight above the coil and the position sensor, the nodal point produced by the relatively large mass of the counterweight is situated at the site of the coil, such that varying coil forces cannot excite oscillations. Furthermore, the position sensor is also situated approximately in this nodal point, so that possible small oscillation amplitudes, which have other causes, do not affect the position sensor and thus the control loop and the determination of the weighing result. With the vertical support(s), a very rigid coupling of the counterweight to the transmission lever, the coil and the position sensor is realized in a vertical direction, so that no additional low-frequency oscillations can occur. The arrangement of the counterweight above the shielding cover makes the counterweight easily accessible. In an exemplary embodiment, the counterweight can be made releasable and may, if necessary, be divided into a plurality of counterweight elements. As a result, an adaptation to different dead loads is easily possible.

BRIEF DESCRIPTION OF THE DRAWINGS

The invention will now be described in greater detail with reference to the drawings, in which.

DETAILED DESCRIPTION OF EXEMPLARY EMBODIMENTS OF THE INVENTION

Figure 1:
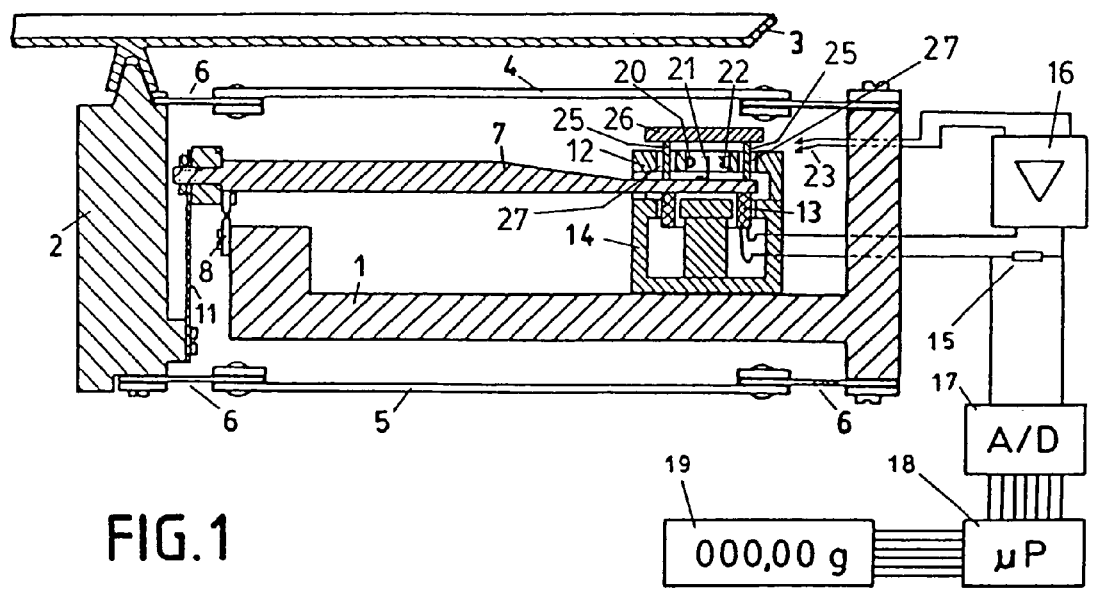
FIG. 1 is a longitudinal section of a first exemplary embodiment of the weighing system.

The weighing system illustrated in FIG. 1 has a system frame 1 that is fixed to the housing. A load receiver 2 is mounted vertically displaceable to the system frame 1 via two guide bars 4 and 5 with linkage points 6. The upper portion of the load receiver 2 carries the weighing tray 3 for receiving the material to be weighed and transfers the weight corresponding to the mass of the material to be weighed to the shorter lever arm of the transmission lever 7 via a coupling element 11. The transmission lever 7 is supported on the system frame 1 by spring linkages 8. A coil 13 is mounted to the longer lever arm of the transmission lever 7. The coil 13 is located in the air gap of a permanent magnet system 14 and produces the load-dependent counterforce. The magnitude of the current flowing through the coil 13 is controlled in a manner known, per se, by the optical position sensor 20, 21, 22 and the control amplifier 16, such that an equilibrium is established between the weight of the material to be weighed and the electromagnetically produced counterforce. The electrical connection to the coil 13 is indicated only schematically in FIG. 1. The current flowing through the coil 13 produces a measuring voltage on the measuring resistor 15, which is supplied to an AC/DC converter 17. The digitized result is transferred to a digital signal processing unit 18 and is digitally displayed in the display 19.

The optical position sensor comprises a radiation transmitter 20, whose power supply is not shown for the sake of clarity, a radiation receiver 22, whose connection 23 to the control amplifier 16 is only schematically indicated, and a slit aperture 21. The radiation transmitter 20 and the radiation receiver 22 are fixed to the shielding cover 12 of the permanent magnet system 14. The slit aperture 21 is fixed to the transmission lever 7. The slit aperture 21 is located approximately on the axis of the coil 13 an end of the transmission lever 7 opposite the shorter lever arm. The parts of the position sensor described above and their cooperation with the control amplifier and the coil for the weighing system using electromagnetic force compensation are generally known, so that there is no need to explain them in detail here.

In addition, the weighing system according to an exemplary embodiment of the invention has two vertical supports 25, which are fixed to the longer lever arm of the transmission lever 7 and extend upwardly through two openings 27 made in the shielding cover 12. A counterweight 26 is mounted to the upper ends of the supports 25. The mass of this counterweight is generally dimensioned such that the counterweight 26 and the coil 13 approximately mechanically balance the weighing tray 3 (including the structures mounted thereto) and the load receiver 2, such that, in the absence of a load, the current passing through the coil 13 is zero or almost zero.

Through this arrangement of the counterweight 26 with its center of gravity approximately on the axis of the coil 13 and directly above the shielding cover 12, the coil, the position sensor and the counterweight 26 form a compact and highly stable unit and jointly form a nodal point. This minimizes the excitation, and the effects, of parasitic oscillations in dynamic weighing operation.

The use of two supports 25 to mount the counterweight 26 has the advantage that the bending stiffness of the transmission lever 7 is increased in the rear area by the bending stiffness of the counterweight. As a result, the natural frequencies of the transmission lever shift toward higher frequencies, so that the dynamic behavior of the weighing system is further improved.

The counterweight 26 has preferably the shape of a flat disk. Thus, it is adapted to the shape of the shielding cover 12 to minimize the additional space required. This also ensures relatively good thermal contact to the shielding cover and the permanent magnet system, so that temperature differences are largely avoided. In exemplary embodiments, the material of the counterweight 26 is non-magnetic, so that the small residual magnetic field, which exists despite the shielding cover, exerts no forces on the counterweight. In a particularly advantageous embodiment, the material used for the counterweight and the supports 25 is the same as that used for the transmission lever 7. This prevents any warping with varying ambient temperatures.

Figure 2:
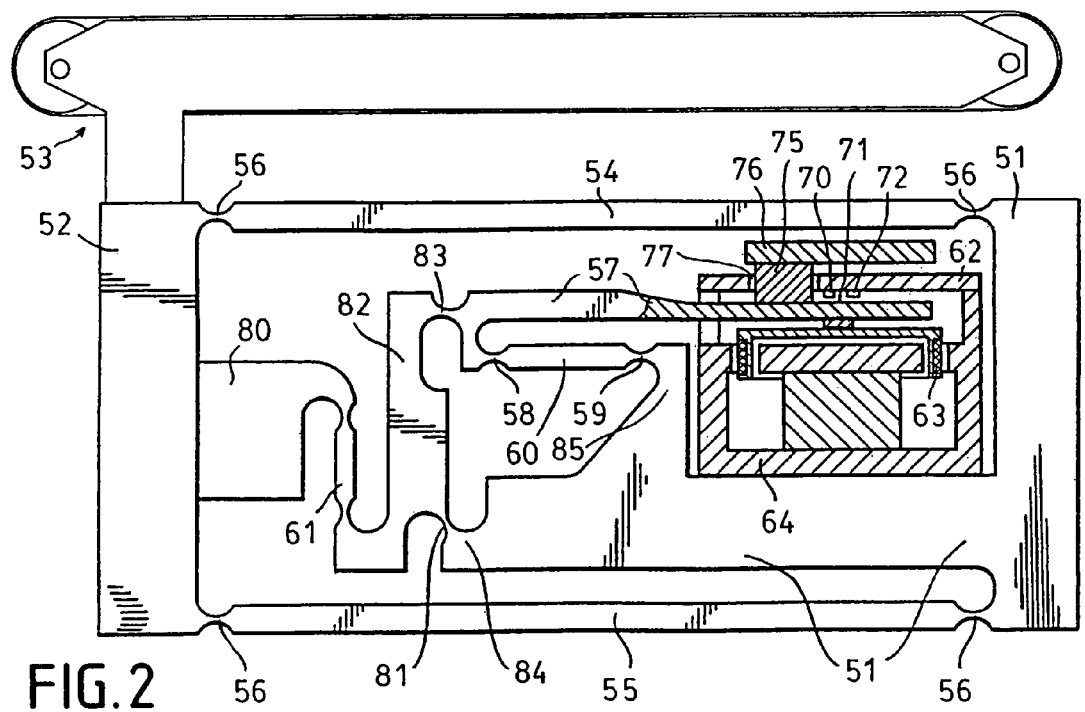
FIG. 2 is a side view of a second exemplary embodiment of the weighing system (in a partial cutaway)

FIG. 2 is a side view of a second exemplary embodiment of the weighing system with a cutaway in the area of the permanent magnet system. The figure shows a load receiver 52 that is connected to an area 51 fixed to the housing via an upper guide bar 54 and a lower guide bar 55 forming a parallel guide. Item 56 indicates the linkage points of the guide bars. A conveyor belt 53 is attached to the load receiver 52. The type of attachment is indicated only schematically. The weight of the material to be weighed is transferred by a projection 80 of the load receiver 52 to a lever 82 via a vertical force transfer element 61. The lever 82 is supported on a projection 84 of the area 51 fixed to the housing by a thin section 81. The lever 82 is an angle lever. It transfers the reduced and redirected, approximately horizontal force via a thin section 83 to a transmission lever 57, which is supported via a thin section 58, a stilt 60 and an additional thin section 59 on a projection 85 of the area 51 fixed to the housing. The transmission lever 57 is also an angle lever. The coil 63 for the electromagnetic force compensation is attached to the longer lever arm. The geometric configuration of this weighing system, which may be fabricated from a monolithic block, is disclosed in German Publication DE 195 40 782 C1, so that there is no need to explain it in detail here.

The magnet system 64 again has a shielding cover 62, which carries the schematically indicated light emitting diode 70 and the photodiodes 72 of the position sensor. The slit aperture 71 fixed to the transmission lever 57 is also indicated only schematically. A vertical support 75 extending through an opening 77 in the shielding cover and carrying the counterweight 76 is fixed to the longer lever arm of the transmission lever 57. The support 75 is disk-shaped to ensure a sufficiently stiff coupling of the counterweight to the transmission lever—particularly relative to the vertical dynamic forces. In addition, the support extends as far as possible up to the center of gravity of the counterweight or the axis of the coil 63 or the position sensor 70/71/72 (the centers of gravity of the counterweight, the coil axis and the position sensor lie at least approximately on a vertical line).

Figure 3:
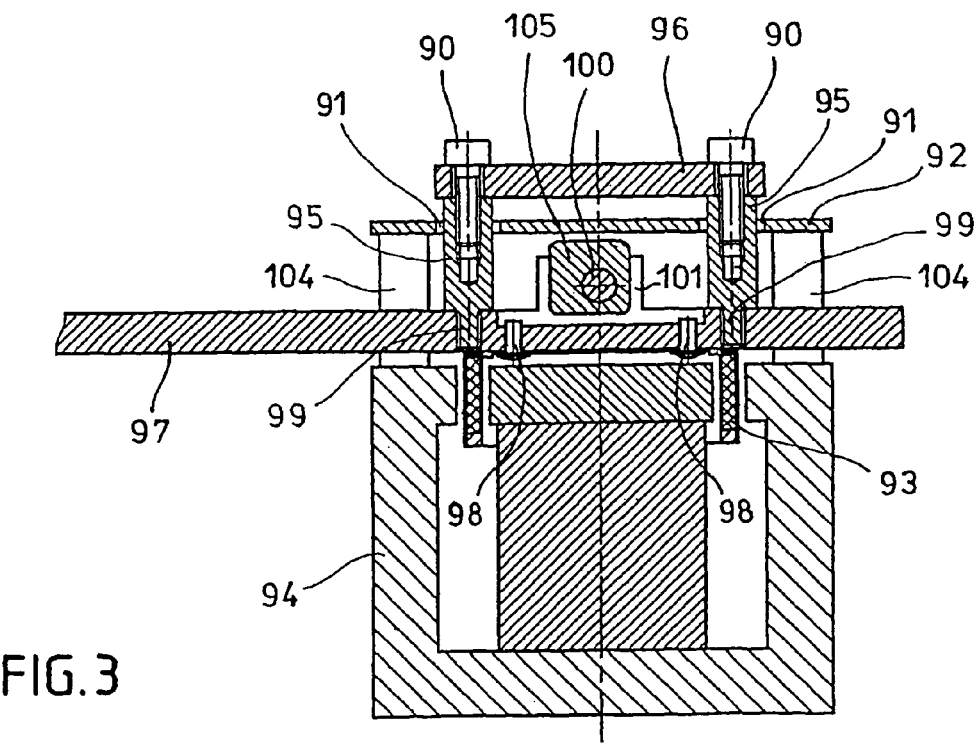
FIG. 3 is an enlarged cross section of the parts of the weighing system according to the invention.

For the sake of clarity, FIGS. 1 and 2 do not show structural details, e.g., with regard to the connections. These details may be seen in FIG. 3, which shows the parts of the weighing system essential to the invention in an exemplary embodiment with two supports in a larger scale. FIG. 3 shows the permanent magnet system 94 with the coil 93, which is fixed to the transmission lever 97 by screws 98. At their lower ends, the supports 95 have a shoulder and a threaded pin 99 with which they are screwed into a threaded hole in the transmission lever 97. At their upper ends, the supports 95 have a vertical blind hole with an interior thread. The counterweight 96 is screwed to the supports by screws 90. At its outer upper rim, the permanent magnet system 94 has a circumferential collar 104, to the topside of which the shielding cover 92 is mounted. The collar 104 has openings for the transmission lever 97 to pass through. Correspondingly, the shielding cover 92 has openings 91 allowing the supports 95 to pass through without contact. Of the position sensor, only the fixation block 105 for the light emitting diode 100 and the slit aperture 101 are shown. The fixation block 105 is fixed to the circumferential collar 104, the slit aperture 101 to the transmission lever 97.

Because the counterweight 96 is releasably connected to the supports 95 by screws 90, it can easily be replaced and adapted to different magnitudes of initial loads on the load receiver of the weighing system.

Figure 4:
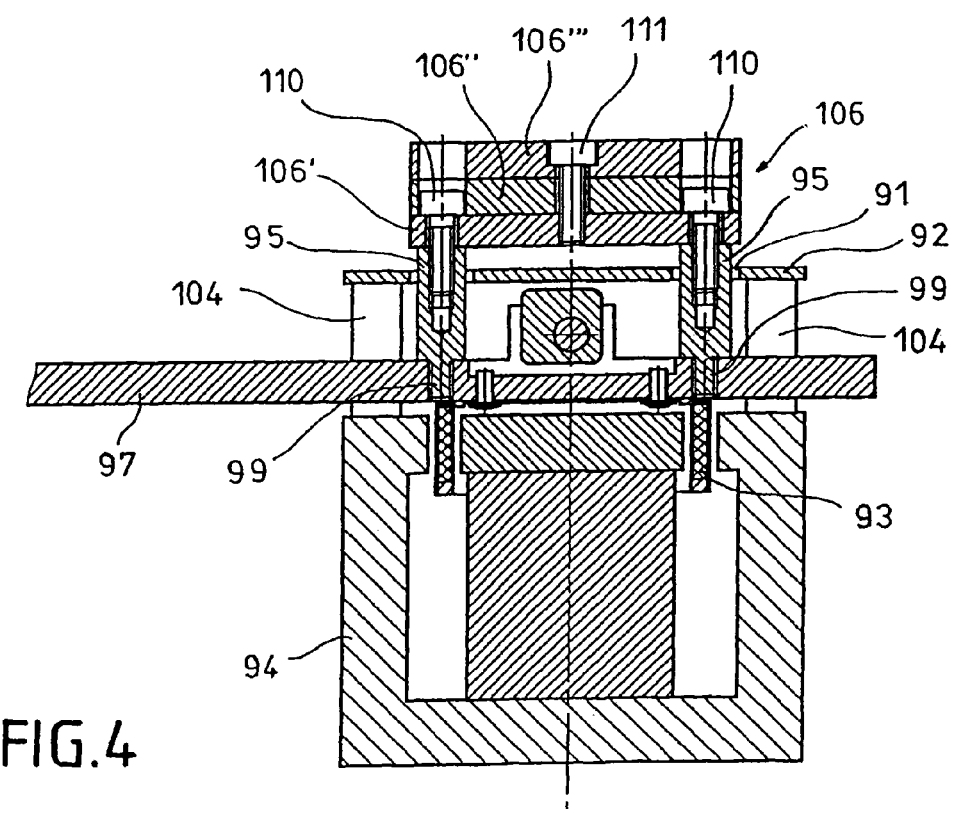
FIG. 4 shows a variant of FIG. 3.

Another means to adapt the magnitude of the counterweight is illustrated in FIG. 4. Like parts are provided with the same reference numbers as in FIG. 3 and are not described again here. In the exemplary embodiment illustrated in FIG. 4, the counterweight 106 is divided into a plurality of counterweight elements 106', 106" and 106'''. The first, bottom counterweight 106' is screwed directly onto the supports 95 by means of screws 110. The additional counterweight elements 106" and 106''' are then connected to the first counterweight element 106' by means of the central screw 111. One advantage of this division into counterweight elements is that it affords greater flexibility. For example, three additional counterweight elements with the gradation 1:2:4 can be used to cover a range from one to seven in a unit gradation. Or, one type of counterweight element can be used to cover a larger range by screwing on any number of additional counterweight elements (as illustrated in FIG. 4). Another advantage is that only the first counterweight element 106' need be made of the same material as the transmission lever 97 in order to avoid bimetal effects. The other counterweight elements can be made of a higher density material to save space, for example. Because of the single-point fixation, the thermal expansion of the additional counterweight elements does not affect the weighing system. Also, the geometric configuration of the additional counterweight elements can be selected much more freely. If space above the permanent magnet system is tight, it is possible to use, for example, a wide, dumbbell-shaped or a wide U-shaped additional counterweight element so that the height of the center of gravity of the counterweight can likewise be adapted to the requirements.

The structural details shown in FIG. 3 and the division of the counterweight into counterweight elements shown in FIG. 4 can of course also be adopted correspondingly for the single support embodiment illustrated in FIG. 2.

The solution according to the invention can of course also be used in weighing systems with different lever apparatuses, such as the weighing system with two additional levers disclosed in German Publication DE 199 23 208 C1.

The above description of the exemplary embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A weighing system, comprising:
   a magnet system including a shielding cover and defining a gap;
   a coil disposed in the gap and arranged to produce a load-dependent counterforce;
   a load receiver;
   a transmission lever, on a longer lever arm of which the coil is attached and on a shorter lever arm of which a weight transferred by the load receiver produces a load-dependent force;
   a position sensor which detects a position of the transmission lever;
   at least one vertical support connected to the transmission lever which extends through at least one opening of the shielding cover; and
   a counterweight disposed on the at least one vertical support, such that the shielding cover is interposed at least in part between the coil and the counterweight.

2. A weighing system as claimed in claim 1, wherein the at least one vertical support is two vertical supports fixed to the transmission lever, which extend respectively through two openings in the shielding cover.

3. A weighing system as claimed in claim 1, wherein the counterweight is releasably connected to the at least one vertical support.

4. A weighing system as claimed in claim 1, wherein the counterweight is disk-shaped.

5. A weighing system as claimed in claim 1, wherein the counterweight comprises a non-magnetic material.

6. A weighing system as claimed in claim 5, wherein the at least one vertical support and the transmission lever comprise the non-magnetic material.

7. A weighing system as claimed in claim 1, wherein the coil defines an axis and a center of gravity of the counterweight is disposed near or on the axis of the coil.

8. A weighing system as claimed in claim 1, wherein the counterweight is divided into a plurality of partial counterweights.

9. A weighing system as claimed in claim 8, wherein the transmission lever comprises a given material and a first one of the plurality of partial counterweights, which is connected directly to the at least one vertical support, comprises the given material.

10. A weighing system as claimed in claim 9, wherein remaining ones of the plurality of partial counterweights are connected to the first partial counterweight at a single point.

11. A weighing system as claimed in claim 1, wherein the magnet system is a permanent magnet system.

12. A weighing system as claimed in claim 1, further comprising a control amplifier to control current flowing through the coil.

13. A weighing system as claimed in claim 3, wherein the counterweight is releasably connected to the at least one vertical support using screws.

14. A weighing system as claimed in claim 1, wherein the coil is attached to a distal end of the longer lever arm of the transmission lever, and wherein the position sensor is arranged at the distal end.

15. A weighing system as claimed in claim 1, further comprising a non-levering coupling interconnecting the load receiver and the transmission lever.

16. A weighing system as claimed in claim 1, further comprising at least one force-reduction lever coupled between the load receiver and the transmission lever.

* * * * *